(No Model.)
J. B. DARBY.
ADJUSTABLE DOUBLE PLOW.
No. 491,675. Patented Feb. 14, 1893.
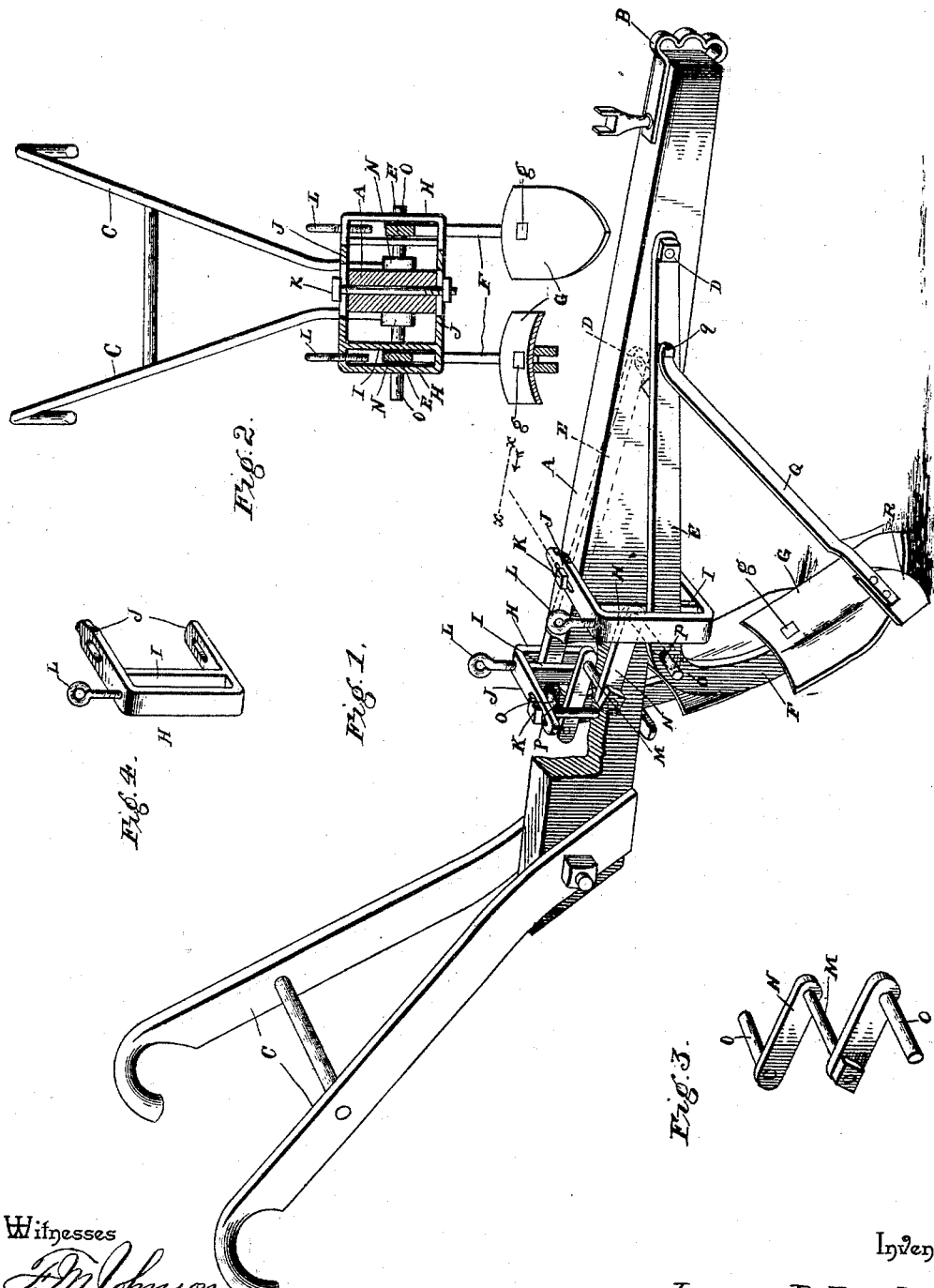
Witnesses
F. M. Johnson
D. P. Wolhaupter
Inventor
James B. Darby
By his Attorneys,
C. A. Snow & Co.
THE NORRIS PETERS CO., PHOTO-LITHO., WASHINGTON, D. C.

UNITED STATES PATENT OFFICE.

JAMES B. DARBY, OF BATESVILLE, MISSISSIPPI.

ADJUSTABLE DOUBLE PLOW.

SPECIFICATION forming part of Letters Patent No. 491,675, dated February 14, 1893.

Application filed October 18, 1892. Serial No. 449,216. (No model.)

*To all whom it may concern:*

Be it known that I, JAMES B. DARBY, a citizen of the United States, residing at Batesville, in the county of Panola and State of Mississippi, have invented a new and useful Adjustable Double Plow, of which the following is a specification.

This invention relates to double shovel plows; and it has for its object to provide a self adjusting plow of this character, each shovel of which readily adjusts itself to hillsides or the side of a corn or cotton bed as well as level ground.

To this end the invention contemplates a self adjusting double shovel plow having simultaneously, though oppositely adjustable, plows so arranged and connected as to provide for a thorough cultivation of the soil, whatever be its character upon which the plow is used.

With these and many other objects in view which will readily appear as the nature of the invention is better understood, the same consists in the novel combination and arrangement of parts hereinafter more fully described and claimed.

In the drawings: Figure 1 is a perspective view partly in section of a self adjusting double shovel plow constructed in accordance with this invention. Fig. 2 is a vertical transverse sectional view on the line $x$—$x$ of Fig. 1 looking toward the handles. Fig. 3 is a detail in perspective of the double crank. Fig. 4 is a detail in perspective of one of the laterally adjustable guide frames.

Referring to the accompanying drawings:—

A represents the main plow beam having the ordinary clevis B at one end and to the other end of which is secured the usual handles C, by means of which the plow is guided and controlled by the operator. Pivotally secured at one end as at D, to opposite sides of the main plow beam A are the opposite shovel beams E, each of which is provided with the rear slotted standard feet F, to the lower ends of which are adjustably secured the shovels or sweeps G, upon the bolts $g$, passing therethrough and the slotted portions of said feet. The pivotally mounted beams E and the shovels carried thereby, are arranged one in advance of the other on opposite sides of the main beam A, and each works within the laterally adjustable guide frames or yoke H. The said guide frames or yokes are provided with the vertical guide slots I in which move the self adjusting beams E, and with the slotted securing arms J embracing the beam A and receiving the adjusting bolts K, which provide means for adjusting the said guide frames laterally to and from the beam A, to adjust the plows to and from each other according to the width or space it is desired to have the same travel apart. Adjusting set screws L work through the upper end of the vertical guide slots I of said side guide frames, and directly over the pivoted beams moving therein, and provide means for the regulation of the vertical play or adjustment of the shovels, or for holding the same stationary in any adjusted position. At a point intermediate of the opposite guide frame H, is journaled, in the beam A, the crank shaft M having the oppositely disposed cranks or crank arms N, swinging on opposite sides of the beam A and each provided with the projecting crank pins O, which loosely engage enlarged perforations or slots P in the pivoted shovel beams E, so as to provide for the simultaneous adjustment of said pivoted beams, said enlarged perforations or slots allowing the crank pivots or pins O a sufficient play for the adjustment of the beams. Now it will be apparent that by means of the double crank described, the opposite plows simultaneously rise and fall alternately, and whichever shovel first comes in contact with the ground, that shovel necessarily rises and through the medium of the double crank will force the other shovel down, thereby providing means whereby both shovels have an equal opportunity to take the ground without the necessity of careening the plow stock. The simultaneous play described also provides for the ready adjustment of the plow to all unevennesses of the soil.

Pivotally secured at one end to one or both of the pivoted shovel beams E is the fender arm Q, which is thus connected as at $q$ to said beams so that the same can be raised or lowered as illustrated in the drawings. To the other end of said arm Q is attached the fender plate R, which when adjusted to its proper position, together with the fender arm, provides means for preventing the shovels from covering young truck.

The construction, operation and many advantages of the herein described self adjusting plow are thought to be apparent without further description.

Changes in the form, proportion and minor details of construction may be resorted to without departing from the principle or sacrificing any of the advantages of this invention.

Having thus described my invention, what I claim and desire to secure by Letters Patent is:—

1. In a self adjusting plow, the combination of the opposite movable shovel beams and an intermediate crank connecting said beams, substantially as set forth.

2. In a plow, the combination with the main beam or stock, of the opposite shovel beams pivoted at one end to said stock, and an intermediate double crank journaled in said main beam or stock and loosely connected to said pivoted shovel beams, substantially as set forth.

3. In a self adjusting plow, the main beam or stock, opposite guide frames, the opposite shovel beams pivoted to said stock and moving in said guide frames, and an intermediate crank connecting said pivoted beams, substantially as set forth.

4. In a self adjusting double plow, the main beam or stock, opposite slotted guide frames, opposite shovel carrying beams, pivoted to opposite side of the stock and moving in said guide frames, means for adjusting the movement of said shovel beams in said frames, and an intermediate crank connecting said beams, substantially as set forth.

5. In a self adjusting double plow, the main beam or stock opposite vertically slotted guide frames laterally adjustable on said stock, opposite shovel beams pivoted at one end to opposite sides of said main beam or stock and moving in the vertical slot of said guide frames, adjusting screws working in said guide frames directly over the shovel beams therein, and an intermediate double crank journaled in the main beam or stock and provided with oppositely disposed crank arms loosely connected to the opposite shovel beams, substantially as set forth.

6. In a plow, the main beam stock, the opposite shovel beams pivoted thereto, the double crank journaled therein and loosely connected to said shovel beams, and the laterally adjustable guide frames for the beams, substantially as described.

In testimony that I claim the foregoing as my own I have hereto affixed my signature in the presence of two witnesses.

JAS. B. DARBY.

Witnesses:
R. V. JOHNSON,
J. H. HOURY.